United States Patent [19]

Goehring et al.

[11] 3,791,915

[45] Feb. 12, 1974

[54] MULTILAYER LAMINATED POLYETHYLENE COPOLYMER-POLYAMIDE FILM

[75] Inventors: Clifford Clayton Goehring, Princeton; Arthur Clifford Hart, Jr., Chester; Derek Wooldridge, Princeton, all of N.J.

[73] Assignee: American Can Company, Greenwich, Conn.

[22] Filed: July 6, 1971

[21] Appl. No.: 160,145

[52] U.S. Cl............ 161/227, 99/171 H, 99/171 LP, 156/244, 156/334, 161/254, 260/78.5 T
[51] Int. Cl....................... B32b 27/34, B32b 27/08
[58] Field of Search..... 99/171 H, 171 LP; 156/334; 161/227, 254; 260/78.5 T

[56] References Cited
UNITED STATES PATENTS

| | | | |
|---|---|---|---|
| 3,423,231 | 1/1969 | Lutzmann | 117/68.5 |
| 3,355,319 | 11/1967 | Rees | 117/122 |
| 3,697,368 | 10/1972 | Bhuta et al. | 161/227 |

Primary Examiner—Alfred L. Leavitt
Assistant Examiner—Robert A. Dawson
Attorney, Agent, or Firm—Robert P. Auber; Paul R. Audet; George P. Ziehmer

[57] ABSTRACT

A heat sealable laminated film including at least a layer of a polyamide polymer, a layer of a blend of polyethylene and a zinc-neutralized ionic copolymer, and an adherent layer of a zinc-neutralized ionic copolymer of ethylene and an $\alpha,\beta$-ethylenically unsaturated carboxylic acid. Preferred respective materials are polycaproamide and a zinc-neutralized ionic copolymer of ethylene and methacrylic acid.

8 Claims, No Drawings

3,791,915

MULTILAYER LAMINATED POLYETHYLENE COPOLYMER-POLYAMIDE FILM

BACKGROUND OF THE INVENTION

This invention relates to laminated films and analogous sheetlike structures for wrapping, packaging and related purposes. More particularly, the invention relates to improved transparent plastic films which are heat sealable and which have high thermal stability and a high resistance to permeation of water and oxygen.

It is well known that laminates of nylon and polyethylene are widely used for packaging various products. The materials have been found especially suitable for foodstuff-containing packages such as bags or pouches subjectable to widely varying temperatures and conditions. For example, they are especially suitable for boil-in-the-bag food packages.

Nylon is used as an outer surface for such packages and is suitable because it is an oxygen barrier, it has a high melting point and is strong and clear. Polyethylene is used as an inner surface and is suitable because it is easily heat sealable, it is moisture impermeable and is relatively chemically inert to many foodstuffs.

Disadvantages of nylon mainly are its high cost, moisture permeability, poor heat sealability and its tendency to be slow to recover upon physical deformation. These disadvantages, however, are largely offset by polyethylene's low cost, low permeability, excellent heat sealability, and its flexibility and quick recovery.

Although the complementary characteristics of nylon and polyethylene make them suitable for use as laminates, especially for foodstuff containing packages, the materials are somewhat incompatible because they often are considerably difficult to initially bond together. This is because of their differences in physical and chemical structures. Also once joined, the materials often separate upon physical deformation. This is because of the materials' aforementioned differing deformation and recovery characteristics.

A number of successful techniques have been developed to overcome these bonding difficulties. These techniques include chemically, electrically or otherwise treating the surface of the polyethylene. These techniques are summarized in U.S. Pat. No. 3,423,231, filed on May 20, 1965. As stated therein, surface treatments are expensive, complex and often dangerous. In addition, their effectiveness is often unsatisfactory.

Another technique which does not involve chemical, electrical or other surface treatments is to incorporate a layer of adhesive between the nylon and polyethylene. For example, the aforementioned reference discloses a nylon-polyethylene laminate bonded by a layer of ethylene-acrylic acid copolymer adhesive. Such an adhesive is said to satisfactorily bond nylon-polyethylene laminates under normal conditions of handling and use. It has been found that the adhesive is unsatisfactory for nylon-polyethylene laminate constructions such as boil-in-the-bag packages which are subjected to higher than normal use temperatures. These temperatures, e.g., boil-in-the-bag temperatures, are often over 200°F, and at such temperatures, delamination occurs and the ethylene-acrylic acid copolymer adhesive tends to soften and creep excessively.

The laminate construction of this invention utilizing a zinc-neutralized ionic copolymer adhesive is not made by chemical, electrical or other surface treatment techniques yet it performs satisfactorily and maintains sufficient cohesion especially at boil-in-the-bag temperatures. The laminate is dimensionally stable in cold environments and, in addition, has a high resistance to oxygen, moisture, water, and various foodstuffs. For certain applications, it has been found that even greater than the aforementioned satisfactory cohesion, stability and resistance to varied environments can be obtained at boiling water temperatures when the polyolefin hydrocarbon polymer layer comprises a blend of polyethylene and a minor amount of a zinc-neutralized ionic copolymer.

The laminate of this invention is advantageous not only because of the aforementioned characteristics but also because its layer of polyethylene is heat sealable to itself and the laminate itself is inexpensive to produce. The expensive nylon and adhesive layers can be kept thin and all of the materials comprising the laminate can be directly coextruded from a single special die as a film of three layers. The film can be used for example for making flat sheets, squeeze tubes, and parisons for blown bottles.

It is therefore an object of this invention to provide a laminated film for wrapping, packaging and related purposes.

It is another object of this invention to provide a laminated film that is inexpensive, heat sealable and has a high resistance to permeation of water, moisture, oxygen, and various foodstuffs.

It is another object of the present invention to provide a laminated film that is especially suitable for foodstuff-containing packages such as bags or pouches subjectable to widely varying temperatures and conditions.

It is still another object of this invention to provide a laminated film that is especially suitable for making boil-in-the-bag pouches.

It is still another object of this invention to provide a laminated film whose materials are coextrudable from a single die in a single step process.

DETAILED DESCRIPTION OF THE INVENTION

The polyamide polymer utilized as a layer in the laminate of this invention is a nylon selected from the group consisting of polycaproamide, polyhexamethylene adipamide, polyhexamethylene sebacamide, polycaprylamide, polyundecanoamide and polydodecanamide. These nylons are respectively commonly known as nylon-6, nylon-6,6, nylon 6,10, nylon 8, nylon 11, and nylon 12. The preferred polyamide is polycaproamide (nylon 6). The materials and their methods of preparation are well known in the art, and they are commercially readily available. An example of a suitable polycaproamide is manufactured by Allied Chemical Corporation and sold as "Plaskon" 8201G.

The polyolefinic hydrocarbon polymer utilized in the laminate of this invention is selected from the group consisting of polyethylene, poly(ethylene co-vinyl acetate), poly(ethylene co-butene), poly(ethylene co-hexene) and a blend of a major amount of polyethylene and a minor amount of a zinc-neutralized copolymer. Preferred polyolefinic hydrocarbon polymers are polyethylene, and a blend of the polyethylene and a zinc-neutralized ionic copolymer. Preferably, especially for laminates subjected to high temperature environments, the polyethylene has a density of from about 0.925 to about 0.970 grams per cc. This preferred range includes medium density polyethylenes which range up to about 0.940 grams per cc. and high density polyethylenes which range above about 0.940. Included in the 0.925 to 0.940 gram per c.c. range are some of the low density polyethylenes. Like the aforementioned nylons, these polyolefins and their methods of preparation are well known in the art. An example of a suitable polyethylene of medium density is produced by Union Carbide Company and sold as "Bakelite" DHDB 4700, and a suitable one of high density is produced by Phillips Petroleum Company and sold as "Marlex" 6009.

When polyethylene is used as a blend with a zinc-neutralized ionic copolymer, it preferably is of medium density. The blend comprises a major amount of polyethylene and a minor amount of the ionic copolymer. The amounts are based on the weight of the blend. Preferably, the blend comprises from about 51 to 95 percent polyethylene and from about 49 to 5 percent ionic copolymer. More preferably, it comprises about 91 percent polyethylene and about 9 percent ionic copolymer.

The ionic copolymers which can be used with polyethylene in the aforementioned blends and which can be used as adhesives are zinc-neutralized ionic copolymers of ethylene and an α,B-ethylenically unsaturated carboxylic acid. The ethylene component can be present in an amount of at least 50 mol percent based on the copolymer. The carboxylic acid monomer can be present in an amount of from about 0.2 to 25 mol percent, preferably 1 to 10 mol percent, based on the copolymer. From about 10 to 90 percent of the acid groups of the acid are neutralized by zinc ions.

The α,B-ethylenically unsaturated carboxylic acids which can be employed to form the ionic copolymer adherent of this invention can be either mono or dicarboxylic acids such as for example acrylic, methacrylic, ethacrylic, itaconic, maleic and fumaric acids, and, monoesters of the dicarboxylic acids such as methyl hydrogen maleate and methyl hydrogen fumarate. Of these acids, the preferred is methacrylic.

Ionic copolymers are well known and sold under the trademark "Surlyn A," registered by E. I. DuPont de Nemours & Company.

Examples of zinc-neutralized ionic copolymer Surlyns which can be utilized in the blends as adhesives of the laminates of this invention are Surlyns A1650, about 40 percent neutralized, A1652, about 23 percent neutralized, AD8071, about 61 percent neutralized, A1800, about 78 percent neutralized, and AD8004-4, about 68 percent neutralized.

Methods of preparing Surlyn ionic copolymers are believed disclosed in U.S. Pat. No. 3,264,272, filed on Apr. 8, 1963 and assigned to "Dupont." That reference discloses that ionic copolymers can be employed as adhesives. Contrary to what is expected however, it has been found that ionic copolymers in general cannot be employed as adhesives. Ionic copolymers are quite selective as to the substrate materials to which they will adhere. Only certain ionic copolymers adhere to certain substrates. The reasons for this are not wholly clear.

Adhesion of the ionomers appears to depend on a variety of factors. One of them is the type of metal ions used to neutralize the acid groups of the copolymer. It has been found that whereas sodium-neutralized Surlyns do not satisfactorily adhere to nylon, zinc-neutralized Surlyns do adhere well to nylon. As examples, Surlyns A1601 and AD8040, both sodium neutralized, do not adhere satisfactorily to Nylon 6, but aforementioned zinc-neutralized Surlyns such as A1650 and A1800 adhere very well to nylon. For example, for a three-layered 1 ½ inch diameter laminated tube comprising respective layers of 5 mil Nylon 6 (Allied Plaskon 8201G), 8 mil Surlyn A1650 or A1800, and 8 mil polyethylene of any density, the adhesion of the Surlyns to Nylon 6 at dry temperatures of about 75° to 150°F, was better than cohesion of the Surlyns themselves. The Nylon-6-Surlyn layers were virtually inseparable by peel. They failed to shear at loads of 11 lb/inch to 44 lb/inch.

Another example of the fact that sodium-neutralized ionomers do not adhere satisfactorily to particular materials is that Surlyn AD8040 does not adhere to polyethylenes. Contrastingly, as shown in subsequent examples, the zinc-neutralized ionomers enumerated in this invention do adhere to polyethylenes. Adhesion appears to depend on the densities of the polyethylenes, for it has been found that zinc-neutralized ionomers adhere fairly well to low density polyethylenes at temperatures below about 100°F, but adhere decreasingly well at temperatures about 100°F. On the other hand, the ionomers adhere well to high density polyethylenes, especially at temperatures above about 150°F. This adhesion at high temperatures makes zinc neutralized Surlyns and high density polyethylenes especially suitable for laminates for packages such as boil-in-the-bag pouches subjectable to high use temperature environments. Adhesion also appears to depend to some extent on the temperature at which the Surlyn-polyethylene laminates are extruded and perhaps to an even greater extent on the temperature to which the laminate is subjected when it is in use. When zinc Surlyns A1650 and A1800 were respectively coextruded at a a temperature of about 450°F with a low density polyethylene of about 0.918 grams per c.c., (Union Carbide DFD 3200 Nat 7), peel strengths of about 2 lb/inch or above were obtained at dry temperatures below about 100°F, about 1 lb/inch at about 120°F, and below about 0.5 lb/inch at about 150°F. But, when the same zinc-neutralized Surlyns were respectively coextruded at a temperature of about 500°F with a high density polyethylene of about 0.960 grams per c.c., (Marlex 6009), peel strengths obtained were about 3.75 lb/inch for dry temperatures of about 150°F, and about 2 lb/inch for temperatures of about 212°F.

The tests show that whereas adhesions to certain low density polyethylenes might be satisfactory for normal conditions of handling and use, i.e., temperatures not much above about 125°F., such adhesion strengths would not be satisfactory for laminates for packages such as boil-in-the-bag pouches subjectable to higher temperature environments, e.g., hot or boiling water, where temperatures can be from about 150° to above about 212°F. For such higher temperatures, satisfactory adhesions are obtained using the preferred medium or high density polyethylenes.

Besides the previously mentioned factors, adhesion of Surlyns to polyethylene also appears to depend, at least to some extent, on the degree or percentage of carboxylic acid groups of the ionomer that are neutralized by zinc ions. It has been found that, in dry tests, Surlyns with low percentages of neutralization adhere better at low/or room temperatures, while those with higher percentages adhere better at higher temperatures. For example, when bonded to high density polyethylenes, Surlyns such as AD8050 and A1650 respectively having about 28 percent and about 41 percent of their acid groups zinc-neutralized, each had peel strengths of about 8 lb/inch at dry temperatures of about 75°F, while Surlyns such as AD8071 and A1800 respectively having about 61 and 78 percent neutralization, had peel strengths of about 4.75 lb/inch at dry temperatures of about 75°F.

It has also been found that adhesions of Surlyns having lesser percentages of neutralization are apparently more affected by changes in temperature than those with greater percentages of neutralization. Peel strengths of Surlyns with lower percentages of neutralization i.e., below about 50 percent have been found to drop more sharply when temperatures rise from 100°F to about 212°F, than Surlyns with higher percentages of neutralization.

The overall thickness of the three-layered nylon-Surlyn-polyethylene laminate of this invention can be anywhere within the range of from about 0.5 up to as high as about 200 mils. Usually, thickness is within the range of from about 0.5 to 21 mils and more usually it is from about 1 to about 10 mils. Preferably, overall thickness ranges are from about 1 to 5.6 mils, more preferably from about 1 to 4.6 mils. Overall thickness can depend on factors as the intended use, method of manufacture, and cost and availability of materials.

Thicknesses of the individual layers of the laminated film can vary within the overall thickness range of up to about 200 mils, and can be, for the polyamide layer, from about 0.4 to 1.5 mil or more, preferably from about 0.7 to 1.1 mil, for the ionic copolymer adhesive, from thinnest measurable thicknesses to about 2 mils or more, preferably from about 0.1 to 1.5 mil., and, for the polyolefinic hydrocarbon layer, from about 0.8 to 3.5 mils or more, more preferably from about 1.5 to 3 mils, and most preferably about 2 mils.

The laminate of this invention can include more than three layers, so long as it includes at least the aforementioned polyamide, ionic copolymer and polyolefin hydrocarbon polymer layers. For example, one of the ionic copolymers can be used to adhere another polyamide or polyolefin hydrocarbon polymer to one or both sides of the laminate. Previously mentioned preferred materials, thicknesses and percentages by weight are also preferred for the laminate when it includes more than only the polyamide, ionic copolymer and polyolefin layers, except that when the polyolefin layer is polyethylene, it can have a density of from about 0.910 to about 0.960 grams per c.c.

The method used to form the at-least-three-layered laminate film of this invention can be any of the various known methods used for manufacturing laminates. These include preforming each of the plies and adhering them together by suitable heat and pressure, or, preforming the nylon and polyethylene plies, coating one or more of the plies with the adhesive by, e.g., a roll or dispersion technique, and then subjecting the formed laminate to suitable temperatures and pressures. Though these methods are satisfactory, a less time consuming, less expensive and more preferred method is to simultaneously coextrude the materials into the at least three-layered laminate by means of a single, special die. This method can be employed because the materials used to form the laminate are easy to draw. The method is fast and economical because it is a single-step, coextrusion process. Any of the various dies including "blown," "cast," "tube," or rod dies can be used, and the laminate formed can be used for example in the form of flat sheets, bags or pouches, squeeze tubes and parisons for blown bottles. Extrusion temperatures and speeds can vary depending upon various factors such as the types of materials extruded, the number of layers to be formed, and the types of dies used. Suitable temperature and speeds for extruding for example, a three layered 5 mil Nylon-6, 8 mil Surlyn A1800 and 8 mil Marlex 6009 laminate tube of about 1½ inch diameter from a single step annular melt lamination die are from about 450° to 550° F at a take off rate of from about 5 to 500 fpm.

The laminates of this invention have a wide variety of useful applications. Among the most useful applications are commercial packages for foods such as smoked meats or frozen foods which can be heated or cooked while still in the package. The laminates of the invention have been used to form boil-in-the-bag pouches which have not delaminated and whose one inch seal has not failed when cooked, uncovered, for up to 30 minutes in boiling waters of up to 212°F. The boil-in-the-bag pouches are not suitable for baking or for use in ovens. Although the bags can be vented to allow escape of air and gases from the bag as it is being heated, it is preferred that the bags not be vented for venting allows the possibility of juices and food material to escape from the bag and collect on cookware.

I claim:

1. A laminate film which does not delaminate when subjected to temperatures ranging from about 120° to about 212°F., comprising at least a layer of polyamide polymer bonded by an adhesive to a layer of a polyolefinic hydrocarbon polymer, having a density of from about 0.925 to 0.970 grams per c.c., said adhesive being an ionic copolymer comprised of at least 50 mol percent ethylene based on the copolymer and about 0.2 to 25 mol percent of an $\alpha, \beta$ -ethylenically unsaturated carboxylic acid based on the copolymer, said $\alpha, \beta$ -ethylene-acid copolymer having from about 35 to 78 percent of its carboxylic acid groups neutralized by zinc ions, and said polyolefinic hydrocarbon polymer is a blend of a major amount of polyethylene and a minor amount of said ionic copolymer each of said polyamide and polyolefinic hydrocarbon polymer layers not having been treated for adhesability.

2. The laminate of claim 1 wherein the polyethylene has a density of from about 0.925 to 0.970 grams per c.c. and said carboxylic acid has up to two carboxyl groups.

3. The laminate of claim 2 wherein said polyamide polymer layer is selected from the group consisting of polycaproamide, polyhexamethylene adipamide, polyhexamethylene sebacamide, polycaprylamide, polyundecamoamide and polydodecanamide.

4. The laminate of claim 3 wherein said polyamide polymer is polycaproamide and said carboxylic acid is methacrylic acid.

5. The laminate of claim 1 wherein said major amount of polyethylene is from about 51 to 95 percent, and said minor amount of ionic copolymer is from about 49 to 5 percent based on the weight of the blend.

6. The laminate of claim 5 wherein said polyethylene has a density of from about 0.925 to about 0.940 grams per c.c., said major amount is about 91 percent and said minor amount is about 9 percent based on the weight of the blend.

7. The laminate of claim 1 wherein said laminate is obtained by a single-pass coextrusion process.

8. The laminate of claim 5 wherein said laminate is obtained by a single-pass coextrusion process.

* * * * *